United States Patent Office

3,369,019
Patented Feb. 13, 1968

3,369,019
PRODUCTION OF HETEROCYCLIC
COMPOUNDS
Lyle A. Hamilton, Pitman, and Phillip S. Landis, Woodbury, N.J., assignors to Mobil Oil Corporation, a corporation of New York
No Drawing. Filed Nov. 26, 1963, Ser. No. 326,260
18 Claims. (Cl. 260—268)

ABSTRACT OF THE DISCLOSURE

This invention relates to production of organic addition products and derivatives thereof in the presence of an alumino-silicate having unique catalytic activity and, in particular, to a process for producing acyclic, aromatic and/or heterocyclic compounds which contain nitrogen, oxygen, and/or sulfur in the presence of alumino-silicate catalysts.

This invention contemplates production of acyclic, aromatic and/or heterocyclic compounds such as mercaptans, glycols, piperazines, dithianes, thioxanes, dioxanes, morpholine, aza-cyclo compounds and the like in the presence of a crystalline alumino-silicate catalyst. In particular, this invention is directed to processes for producing addition products and derivatives thereof by effecting reaction of a hydride of nitrogen, sulfur or oxygen with epoxides, episulfides, cyclicimines, or substituted aliphatic compounds, e.g., mercaptans, alcohols, amines, halogenated aliphatic compounds and the like in the presence of an alumino-silicate catalyst containing active cation sites within an ordered internal structure.

The organic compounds to be reacted with the hydrides of nitrogen, oxygen or sulfur may be represented by the following general formula:

FORMULA I

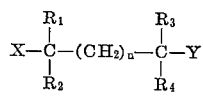

wherein X and Y together represent a common coupling atom selected from the group consisting of nitrogen, oxygen, and sulfur and when taken alone X and Y each represent members selected from the group consisting of —SH, —OH, —NH$_2$, —NHCH$_2$CH$_2$OH,

—NHCH$_2$CH$_2$NH$_2$ and a halo group; when X and Y together represent a common coupling atom; $R_1$ through $R_4$ each represent members selected from the group consisting of hydrogen and monovalent hydrocarbon radicals containing from 1 to 30 carbon atoms and $n$ represents an integer having a value from zero to 1; and when X and Y are taken alone, said monovalent hydrocarbon radicals are alkyl radicals containing from 1 to 6 carbon atoms and $n$ is zero.

The term "monovalent hydrocarbon radicals" as used herein is intended to encompass substituted hydrocarbon radicals as well as unsubstituted hydrocarbon radicals.

Exemplary of such radicals are the following: alkyl radicals, such as methyl, ethyl, n-propyl, n-butyl, n-hexyl, 2-ethyl-n-hexyl, n-octyl, n-dodecyl, and the like; cycloalkyl radicals, such as cyclohexyl and the like; unsaturated aliphatic radicals, such as allyl, cyclopentenyl, and the like; halogenated alkyl and cycloalkyl radicals, such as chloroethyl, bromoethyl, fluoroethyl, 2-chloro-n-propyl, 2-bromo-n-propyl, 2-chloro-n-butyl, 3-chloro-n-amyl, 3-bromo-n-amyl, 2-chloro-n-hexyl, 2-chlorocyclohexyl, and the like; alkoxy and aryloxy substituted alkyl and cycloalkyl radicals, such as methoxymethyl, ethoxyethyl, 3-ethoxy-n-propyl, 4-ethoxy-n-butyl, 3-ethoxy-2-ethyl-n-hexyl, 2-methoxycyclohexyl, phenoxymethyl, 2-phenoxyethyl, 3-phenoxy-n-propyl, 2-phenoxycyclohexyl, and the like; aralkyl radicals, such as benzyl, 2-phenylethyl, 3-phenyl-n-propyl, 1-phenyl-n-butyl, 1-phenyl-n-docosyl, and the like; aryl radicals, such as phenyl, naphthyl, and the like; halogenated aryl radicals, such as p-chlorophenyl, p-bromophenyl, p-fluorophenyl, p-iodophenyl, 2-chloronaphthyl, 2-bromonaphthyl, and the like; alkoxy and aryloxy substituted aryl radicals, such as p-methoxyphenyl, p-ethoxyphenyl, p-n-propoxyphenyl, and the like; alkaryl radicals, such as o-methylphenyl, p-ethylphenyl, p-n-propylphenyl, o-n-propylphenyl, o-n-butylphenyl, p-n-dodecylphenyl, p-(2-ethyl-n-hexyl)phenyl, and the like.

Representative of some of the reactable organic compounds are epoxides, e.g., ethylene oxide, propylene oxide, epichlorhydrin, 2,3-epoxybutane, and the like; episulfides, e.g., 1,2-epithioethane, 1,2-epithiobutane and the like; cyclicimines, e.g., ethylenimine, methyl aziridine, ethyl aziridine and the like; aliphatic mercaptans, e.g., 1,2-dimercaptoethane, 1,2-dimercapto propane, 2,3-dimercaptobutane and the like; aliphatic alcohols e.g., ethylene glycol, pinacol, dihydroxybutane and the like, aliphatic amines, e.g., ethanol amine, diethanolamine, triethanolamine and halogenated aliphatic compounds e.g., ethylene chloride, 1-chloro-2-hydroxyethane, 1-hydroxy-2-chloroethane and the like, and homologs thereof. In general, these compounds contain from 2 to 30 carbon atoms per molecule and have either a bridge grouping such as —O— and —S—, or two reactive terminal groups such as —OH, —Cl, —SH, —Br, and the like attached to their molecular moieties.

The hydrides of nitrogen, oxygen and sulfur which can be employed as reactants for this invention include ammonia, water, hydrogen sulfide, and the like. The reactants may be introduced alone or in an inert fluid carrier. Thus, substantially pure gaseous ammonia, gaseous ammonia mixed with inert gases (N$_2$, CO$_2$, and the like) liquid ammonia, aqueous ammonia solutions or ammonia dissolved in an organic solvent may be used. Likewise, gaseous hydrogen sulfide as well as water in the vapor phase may be mixed with inert carrier gases. It will be appreciated that the manner of employing these reactants is determined by the alumino-silicate catalyst and the reaction conditions to be employed, as well as the desired addition products.

In accordance with this invention, it has been found that a variety of addition products can be produced by the present processes. Thus, cyclic-organic compounds, i.e., episulfides, epoxides, and the like can be reacted, as described, with a hydride of nitrogen oxygen, or sulfur to produce open chain derivatives such as 2-mercaptoethanol, ethyleneglycol, pinacol and the like. Usually, these open chain derivatives are produced under less severe operating conditions, i.e., low reaction temperatures, catalysts of lower activity and the like.

Illustrative of the suitable episulfides are those compounds which have at least one epithio, i.e.,

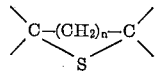

group per molecule, wherein $n$ is an integer having a value of zero or 1. The episulfides can be saturated or unsaturated; aliphatic, cycloaliphatic, or aromatic and their epithio groups can be present either as terminal or interior groups.

Particularly desirable episulfides, for purposes of this invention, have the formula:

FORMULA II

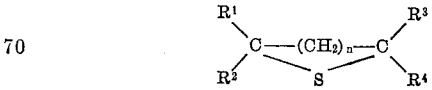

wherein, as previously defined in Formula I, $R_1$ through $R_4$ each represent hydrogen or a monovalent hydrocarbon radical and $n$ is an integer from 0 to 1.

Representative episulfides falling within the scope of Formulae I and II are the following: epithiiranes, such as epithioethane, 1,2-epithiopropane, 1,2-epithiobutane, 1,2-epithiopentane, 1,2-epithiodecane, 1,2-epithiotriacontane, 2,3-epithiobutane, 2,3-epithiopentane, 4,5-epithiodecane, 2,3-epithiobutene-1, 1-phenyl-1,2-epithioethane, 3-phenoxy-1,2-epithiopropane, 5-phenyl - 1,3 - epithiopentane, epithiocyclopentane, epithiocyclohexane, and the like.

Exemplary of other episulfides are the compounds wherein the sulfur atom of the epithio ring is attached to carbon atoms once removed. These compounds are illustrated by the following: 1,3-epithiopropane, 1,3-epithiobutane, 1,3-epithiopentane, and the like.

Among episulfides having more than one epithio group per molecule can be noted: 1,2,4,5-diepithiopentane, bis(2,3-epithiobutyl)ether, bis(2,3-epithiopropylether) of ethylene glycol, bis(2,3-epithiopropylether) of propylene glycol, bis(2,3-epithiopropyl)ether of bis(4-hydroxyphenyl)-propane, and the like.

The reactions which result in the preparation of mercaptans, in accordance with this invention, can be illustrated by the equations which follow wherein epithioethane is used as one of the reactants, by way of illustration only.

*Equation I.—Reaction of an episulfide with water*

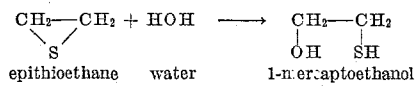

epithioethane    water    1-mercaptoethanol

*Equation II.—Reaction of an episulfide with hydrogen sulfide*

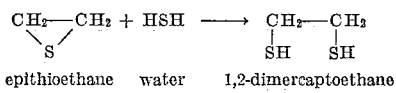

epithioethane    water    1,2-dimercaptoethane

*Equation III.—Reaction of an episulfide with ammonia*

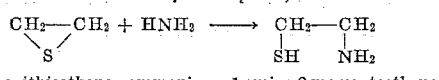

epithioethane    ammonia    1-amino-2-mercaptoethane

It will be appreciated that on reacting either water or ammonia with an episulfide the reaction product will be a mixture of position isomers. That is to say, for example, on reacting 1,2-epithiopropane with water, the resultant product will be 1-hydroxy-2-mercaptopropane and 1-mercapto-2-hydroxypropane since either one of the two bonds connecting the sulfur atom to a carbon atom are capable of rupture under conditions of the reaction.

It will also be appreciated that other cyclic compounds which are within the scope of Formula I, e.g., the epoxides, and the like may be reacted in a like manner to produce corresponding open chain derivatives, i.e., glycols, ethanol amines and the like.

It has also been found in accordance with this invention that heterocyclic compounds can be produced by reacting a hydride of nitrogen, oxygen, or sulfur with organic compounds that fall within the scope of Formula I when $n$ is zero and $R_1$ through $R_4$ each represent alkyl radicals containing 1 to 6 carbon atoms. In general, the heterocyclic compounds are produced when the operating conditions employed for these reactions are more severe than those used to produce the open chain derivatives; i.e., higher temperatures, more active catalysts, and the like.

Particularly reactive organic compounds suitable for producing heterocyclic compounds have the following formula:

FORMULA III $$\begin{array}{c} R_1 \quad R_3 \\ | \quad\quad | \\ X-C-C-Y \\ | \quad\quad | \\ R_2 \quad R_4 \end{array}$$

wherein $R_1$ through $R_4$ are as previously described, and X and Y together represent a common hetero atom, e.g., nitrogen, or taken alone each represent a member such as —OH, —SH and the like, as defined above in Formula I.

The heterocyclic compounds which are produced by the present process may contain one or more hetero atoms, usually two, within their molecular moiety. In some instances these compounds are six-membered rings that have two like or unlike hetero atoms (e.g., piperazine, morpholine, dioxane, dithiane, thioxane, and the like, and homologs thereof). Also, three-membered ring compounds, e.g., ethylenimine, bicyclic bridged systems, e.g., triethylenediamine and five-membered rings, e.g., thiophene may be produced in the presence of the aluminosilicate catalysts. In addition, derivatives of the heterocyclic compounds may have substituents such as the halo groups, hydroxy, mercapto, amino and the like attached to their ring structures.

It is believed that formation of these compounds involves a reaction mechanism of either ring closure or ring enlargement. That is, it has been found that ammonia and ethylene oxide may react to form piperazine by enlargement of the cyclic ethylene oxide, with replacement of the hetero oxygen atoms for hetero nitrogen atoms. In a like manner, hydrogen sulfide reacts with ethylene oxide to form p-dithiane, p-thioxane or p-dioxane or mixtures thereof. It will be appreciated that dioxane contains two hetero atoms of oxygen which may result from replacement of a hetero sulfur atom or by direct coupling of two ethylene oxide molecules.

Ring closure apparently results during formation of piperazine by condensation of ammonia with diethanolamine, ethylene glycol, dichloroethane or the like aliphatic compounds; water and hydrogen chloride often being by-products of these reactions.

It will be appreciated that certain of these reactions which produce heterocyclic compounds may also involve formation of by-products or intermediate compounds such as β-hydroxyethylmercaptan, thiodiglycol, diethylene glycol, ethanolamine, diethylenetriamine, and the like. Some of these compounds may be subsequently condensed to heterocyclic compounds in the presence of the aluminosilicate catalysts, while others are found in the product stream.

The production of organic addition products in accordance with this invention, is conducted utilizing as a catalyst an alumino-silicate having an ordered internal structure which can be either naturally occurring or synthetically produced. These catalysts contain active sites that are formed by the presence of certain exchangeable metal cations and/or hydrogen ions ionically bonded or chemi-sorbed within the ordered internal structure of the alumino-silicate; preferably the cations are those which form a high concentration of hydrogen sites within the alumino-silicate.

It will be appreciated that the exchangeable cations and/or ions may be present within the catalyst by base exchanging them with either a naturally occurring or a synthetic alumino-silicate, by incorporating the cations and/or ions during the formation of a synthetic aluminosilicate, or by being an integral portion of a naturally occurring alumino-silicate. In general, the unique activity of the alumino-silicate catalyst for effecting the present reactions depends on the nature and concentration of its active sites as well as the availability of the sites for contact with the reactants.

In accordance with the present invention, several different types of alumino-silicates can be employed as catalysts. Particularly effective catalysts are the alumino-silicates that contain a high concentration of hydrogen sites within an ordered internal structure. These hydrogen sites are produced by ionically bonding or chemisorbing certain metal cations and/or hydrogen ions within the molecular structure of the alumino-silicate. Such bonding or chemisorption can be effected by base exchange of the alumino-silicate with a fluid medium containing the metal cations and/or hydrogen ions, the resulting exchanged product often thus acquiring an acid character.

In addition, those alumino-silicates having a sparse distribution of hydrogen sites can also be employed as catalysts. Thus, the alkali metal (e.g., sodium, lithium and the like) and alkaline earth metal (e.g., calcium, potassium and the like) forms of the synthetic and naturally occurring alumino-silicates, including zeolite A and the faujasites, such as zeolites X and Y, can serve as catalysts. (These zeolites are hereinafter described in greater detail.)

Alumino-silicate catalysts having a high concentration of hydrogen sites can be prepared from a variety of naturally occurring and synthetic alumino-silicates. These alumino-silicates have exchangeable metal cations (e.g., alkali metals and alkaline earth metals) that can be completely or partially replaced, by conventional base exchange, with certain other metal cations and/or hydrogen ions.

Some alumino-silicates can be base exchanged directly with hydrogen ions, as indicated in the preceding paragraph, to form products which have an acid character and which are suitable for use as catalysts. Other alumino-silicates such as zeolite X, a synthetic faujasite, are either not suitable for direct base exchange with hydrogen ions, or are not structurally or thermally stable after a portion of their exchangeable metal cations have been replaced with hydrogen ions. Thus, it is often necessary to exchange other metal cations with these alumino-silicates in order to achieve the necessary stability within the ordered internal structure prior to the inclusion of the hydrogen ions.

Furthermore, the stability and the distribution of active cation sites formed within an alumino-silicate is also affected by the silicon to aluminum atomic ratio within its ordered internal structure. In an isomorphic series of crystalline alumino-silicates, the substitution of silicon for aluminum in the rigid framework of the lattice results in a decrease of total cation sites as evidenced by reduction of exchange capacity and proved by elemental analysis. Thus, among the faujasite isomorphs, the zeolite known as Y will have a sparser distribution of sites within its pores than the zeolite known as X.

It has been found that alumino silicates having a high silicon to aluminum atom ratio are particularly desirable as catalysts, for purposes of this invention. As a rule, the ratio of silicon to aluminum atoms is at least about 1.8 to 1, in this preferred type catalyst. These catalysts are readily contacted with solutions which contain hydrogen ions and are readily regenerated, after having been used, by contact at elevated temperatures with an oxygen containing stream under controlled conditions such that carbonaceous residues can be efficiently removed without damage to the essential structure and properties of the catalyst.

It will also be appreciated that the concentration of the hydrogen sites within certain alumino-silicates, as described above, may vary according to the cations employed, the degree of base exchange, as well as the alumino-silicate being treated. Accordingly, it has been determined that the alumino-silicates having at least 0.5 milliequivalent of hydrogen per gram of solid and preferably above about 0.75 milliequivalent of hydrogen per gram of solid are effective catalysts for purposes of this invention. It will be understood that this value indicates the total concentration of hydrogen ions present within an alumino-silicate and that the spatial concentration of these ions is dependent on the ordered internal structure of the specific alumino-silicate being treated.

Because the unique activity of the alumino-silicate catalyst for effecting the reactions of the present invention is dependent on the availability of active cation sites therein, as well as the nature of these sites, the defined pore size of the alumino-silicate is to be considered during its preparation. In general, the alumino-silicate should have a pore size of such dimensions that it can accept the reactants of this invention within its order internal structure and allow egress of the products. It will be appreciated that in some instances, alumino-silicates having small pore sizes provide effective catalysts for production of heterocyclic products as well as the open chain derivatives heretofore described. Thus, the pore size is from at least about 4 A. and preferably about 4 A. to about 15 A. in diameter. It will be appreciated that the selection of the alumino-silicate catalyst, to be used in a specific application, will depend upon the reactants and also the reaction products.

Typical of the alumino-silicates employed in accordance with this invention, are alumino-silicates, both natural and synthetic, which have a defined pore size of at least about 4 A. and preferably from about 4 A. to about 15 A. within an ordered internal structure. These alumino-silicates can be described as a three dimensional framework of $SiO_4$ and $AlO_4$ tetrahedra in which the tetrahedra are cross-linked by the sharing of oxygen atoms whereby the ratio of the total aluminum and silicon atoms to oxygen atoms is about 1:2. In their hydrated form, the alumino-silicates can be represented by the formula:

$$M_{2/n}O:Al_2O_3:wSiO_2:yH_2O$$

wherein M is a cation which balances the electrovalence of the tetrahedra, $n$ represents the valence of the cation, $w$ the moles of $SiO_2$, and $y$ the moles of $H_2O$. The cation can be any one or more of a number of metal ions depending on whether the alumino-silicate is synthesized or occurs naturally. Typical cations include sodium, lithium, potassium, calcium and the like. Although the proportions of inorganic oxides in the silicates and their spatial arrangement can vary, effecting distinct properties in the alumino-silicates, the two main characteristics of these materials is the presence in their molecular structure of at least about 0.5 equivalent of an ion of positive valence per gram atom of aluminum, and an ability to undergo dehydration without substantially affecting the $SiO_4$ and $AlO_4$ framework.

One of the crystalline alumino-silicates utilized by the present invention is the synthetic faujasite designated as zeolite X, and is represented in terms of mole ratios of oxides as follows:

$$1.0 \pm 0.2\ M_{2/n}O:Al_2O_3:2.5 \pm 0.5\ SiO_2:yH_2O$$

wherein M is a cation having a valence of not more than 3, $n$ represents the valence of M, and $y$ is a value up to 8, depending on the identity of M and the degree of hydration of the crystal. The sodium form can be represented in terms of mole ratios of oxides as follows:

$$0.9\ Na_2O:Al_2O_3:2.5\ SiO_2:6.1\ H_2O$$

Zeolite X is commercially available in both the sodium and the calcium forms.

It will be appreciated that the crystalline structure of zeolite X is different from most zeolites in that it can adsorb molecules with molecular diameters up to about 10 A.; such molecules including branched chain hydrocarbons, cyclic hydrocarbons, and some alkylated cyclic hydrocarbons.

Other alumino-silicates are contemplated as also being effective catalytic materials for the invention. Of these alumino-silicates, a synthetic faujasite, having the same crystalline structure as zeolite X and designated as zeolite Y has been found to be active. Zeolite Y differs from zeolite X in that it contains more silica and less alumina.

Zeolite Y is represented in terms of mole ratios of oxides as follows:

$$0.9 \pm 0.2\ Na_2O:Al_2O_3:WSiO_2:XH_2O$$

wherein W is a value greater than 3 up to about 5 and X can be a value up to about 9.

The selectivity of zeolite Y for larger molecules is appreciably the same as zeolite X because its pore size extends from 10 A. to 13 A.

Another synthesized crystalline alumino-silicate, designated as zeolite A, has been found to be effective for purposes of this invention. This zeolite can be represented in mole ratios of oxides as:

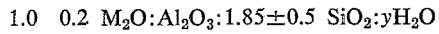
$$1.0 \pm 0.2\ M_2O:Al_2O_3:1.85\pm0.5\ SiO_2:yH_2O$$

wherein M represents a metal, $n$ is the valence of M, and $y$ is any value up to about 6.

The sodium form of this zeolite can be represented by the following formula:

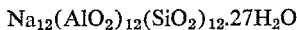
$$Na_{12}(AlO_2)_{12}(SiO_2)_{12}.27H_2O$$

This material, often designated as a "4A" zeolite, has a pore size of about 4 A. in diameter. When the sodium cations have been substantially replaced with calcium by conventional exchange techniques, the resulting zeolite is designated as a "5A" zeolite and has a defined pore size of 5 A. in diameter.

Other alumino-silicate materials found to be active in the present process are designated as mordenite and mordenite-like structures. These zeolites have an ordered crystalline structure having a ratio of silicon atoms to aluminum atoms of about 5 to 1. In its natural state mordenite usually occurs as a salt of sodium, calcium and/or potassium. The pure sodium form may be represented by the following formula:

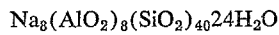
$$Na_8(AlO_2)_8(SiO_2)_{40}24H_2O$$

Mordenite has an ordered crystalline structure made up of chains of 5-membered rings of tetrahedra. In its sodium form the crystal is believed to have a system of parallel channels having free diameters of about 4.0 A. to about 4.5 A., interconnected by smaller channels, parallel to another axis, on the order of 2.8 A. free diameters. Advantageously, in certain ionic forms, e.g. acid exchanged, the mordenite crystal can have channels with effective free diameters of from about 6.5 A. to about 8.1 A. As a result of this crystalline framework, mordenite in proper ionic forms, sorbs benzene and other cyclic hydrocarbons.

It will be appreciated that other alumino-silicates can be employed as catalysts for the processes of this invention. A criterion for each catalyst is that its ordered internal structure must have defined pore sizes of sufficient diameters to allow entry of the preselected reactants and the formation of the desired reaction products. Furthermore, the alumino-silicate advantageously should have ordered internal structure capable of chemisorbing or ionically bonding additional metals and/or hydrogen ions within its pore structure so that its catalytic activity can be altered for a particular reaction. Among the naturally occurring crystalline alumino-silicates which can be employed are faujasite, heulandite, clinoptilolite, chabazite, gmelinite, mordenite and mordenite-like structures, and dachiardite.

One of the preferred alumino-silicate catalysts is prepared from the sodium form of zeolite X having a pore size of about 13 A. This alumino-silicate is a commercially available zeolite designated as Linde "13X". Another suitable catalyst can be prepared by conventional base exchanging involving partial or complete replacement of the sodium of zeolite X by contact with a fluid medium containing cations of one of the rare earth metals. Any medium which will effect ionization without affecting the crystalline structure of the zeolite can be employed. After such treatment, the resulting exchanged zeolite product is water washed, dried and dehydrated. The dehydration thereby produces the characteristic system of open pores, passages, or cavities of the crystalline alumino-silicates.

As a result of the above treatment, the rare earth exchanged alumino-silicate is an activated crystalline catalyst material in which the molecular structure has been changed by having rare earth cations and hydrogen ions chemisorbed or ionically bonded thereto. Furthermore, it will be appreciated that the defined pore size of the rare earth exchanged zeolite X may vary from above 6 A., generally from 6 A. to 15 A., and preferably in the approximate range of 10 A. to 13 A. in diameter.

Advantageously, the rare earth cations can be provided from the salt of a single metal or preferable mixture of metals such as a rare earth chloride or didymium chlorides. Such mixtures are usually introduced as a rare earth chloride solution which, as used herein, has reference to a mixture of rare earth chlorides such as the chlorides of lanthanum, cerium, praseodymium, and neodymium, with minor amounts of samarium, gadolinium, and yttrium. This solution is commercially available and contains the chlorides of a rare earth mixture having the relative composition cerium (as $CeO_2$) 48 percent by weight, lanthanum (as $La_2O_3$) 24 percent by weight, praseodymium (as $Pr_6O_{11}$) 5 percent by weight, neodymium (as $Nd_2O_3$) 17 percent by weight, samarium (as $Sm_2O_3$) 3 percent by weight, gadolinium (as $Gd_2O_3$) 17 percent by weight, samarium (as $Sm_2O_3$) 3 percent by weight, gadolinium (as $Gd_2O_3$) 2 percent by weight, yttrium (as $Y_2O_3$) 0.2 percent by weight, and other rare earth oxides 0.8 percent by weight. Didymium chloride is also a mixture of rare earth chlorides and has a low cerium content. It contains the following rare earths determined as oxides: lanthanum, 45–46 percent by weight; cerium, 1–2 percent by weight; praseodymium, 9–10 percent by weight; neodymium, 32–33 percent by weight; samarium, 5–6 percent by weight; gadolinium, 3–4 percent by weight; yttrium, 0.4 percent by weight; other rare earths, 1–2 percent by weight. It is to be understood that other mixtures of rare earths are equally suitable for purposes of the present invention.

Another active catalyst can be produced from zeolite X by base exchange of both rare earth cations and hydrogen ions to replace the sodium cations from the aluminosilicate. This base exchange can be accomplished by treatment with a fluid medium containing the rare earth salts followed by another containing hydrogen ions or cations capable of conversion to hydrogen ions. Inorganic and organic acids represent the source hydrogen ions, whereas ammonium compounds are representative of the compounds containing cations capable of conversion to hydrogen ions. It will be appreciated that this fluid medium can contain a hydrogen ion, an ammonium cation, or mixture thereof, and have a pH from about 1 to about 12.

Other effective catalysts can be prepared from aluminosilicates such as zeolite Y and mordenite. Advantageously, the sodium form of zeolite Y alone can be employed as catalytic material. Also, exchange of rare earth metals for the sodium cations within zeolite Y produces a highly active catalyst in a manner similar to that described for preparation of the rare earth exchanged zeolite X. In addition, because of its high acid stability, zeolite Y may be treated by partially replacing the sodium ions with hydrogen ions. This replacement can be accomplished by treatment with a fluid medium containing a hydrogen ion or an ion capable of conversion to a hydrogen ion (i.e., inorganic acids or ammonium compounds or mixture thereof).

Zeolite "4A" also can serve as an effective catalyst. Also, although this zeolite material can be base exchanged with other divalent metal cations in a manner similar to that described for preparation of the rare earth exchanged faujasites; preferably it is used in its calcium form as the "5A" zeolite.

Mordenite can be activated to serve as a catalyst for the instant invention by replacement of the sodium ion with a hydrogen ion. The necessary treatment is essentially the same as that described above for the preparation of acid zeolite Y except that a mineral acid such as HCl is used as a source of hydrogen ion. In general, the mordenite is reduced to a fine powder (approximately passing a 200 mesh sieve and preferably passing 300 and 325 mesh sieves or finer) and then acid treated.

It will be appreciated that cations of metals other than the rare earths having mono- and polyvalences can be employed to replace the exchangeable cations from the alumino-silicates to provide effective catalysts for this invention. Exemplary of these metals are zinc, magnesium, tin, cobalt, nickel, silver, and the like. Moreover, other higher valence metals such as zirconium, titanium, vanadium, chromium, manganese, iron, tungsten, and the like can also be employed. It will be understood that the chemical properties of the metal, i.e., its atomic radius, degree of ionization, hydrolysis constant, and the like, may determine its suitability for exchange with a particular alumino-silicate material. It will also be appreciated that certain divalent metals such as calcium, barium, and magnesium can be used with ammonium chloride or like ammonium compounds to produce active cation sites within the alumino-silicate catalyst by conventional base exchange techniques, the ammonium ion being decomposed to form hydrogen sites by heating the exchanged alumino-silicate to drive off ammonia.

The alumino-silicate catalyst can be employed directly as a catalyst or it can be combined with a suitable support or binder. The particular chemical composition of the latter is not critical. It is, however, necessary that the support or binder employed be thermally stable under the conditions at which the conversion reaction is carried out. Thus, it is contemplated that solid porous adsorbents, carriers and supports of the type heretofore employed in catalytic operations can feasibly be used in combination with the crystalline alumino-silicate. Such materials can be catalytically inert or can possess an intrinsic catalytic activity or an activity attributable to close association or reaction with the crystalline alumino-silicate. Such materials include by way of examples, dried inorganic oxide gels and gelatinous precipitates of alumina, silica, zirconia, magnesia, thoria, titania, boria and combinations of these oxides with one another and with other components. Other suitable supports include activated charcoal, mullite, kieselguhr, bauxite, silicon carbide, sintered alumina and various clays. These supported crystalline alumino-silicates can be prepared by growing crystals of the alumino-silicate in the pores of the support. Also, the alumino-silicate can be admixed with a suitable binder, such as inorganic oxide hydrogel or clay, for example, by ball milling the two materials together over an extended period of time, preferably in the presence of water, under conditions to reduce the particle size of the alumino-silicate to a weight mean particle diameter of less than about 40 microns and preferably less than about 15 microns. Also, the alumino-silicate can be combined with and distributed throughout a gel matrix by dispersing the alumino-silicate in powdered form in an inorganic oxide hydrosol. In accordance with this procedure, the finely divided alumino-silicate can be dispersed in an already prepared hydrosol or, as is preferable, where the hydrosol is characterized by short gelation time, the finely divided alumino-silicate can be added to one or more of the reactants used in forming the hydrosol or can be admixed in the form of a separate stream with streams of the hydrosol-forming reactants in a mixing nozzle or other means where the reactants are brought into intimate contact. The powder-containing inorganic oxide hydrosol sets to a hydrogel after lapse of a suitable period of time and the resulting hydrogel can thereafter, if desired, be exchanged to introduce selected ions into the alumino-silicate and then dried and calcined.

The inorganic oxide gel employed, as described above as a matrix for the metal alumino-silicate, can be a gel of any hydrous inorganic oxide, such as, for example, aluminous or siliceous gels. While alumina gel or silica gel can be utilized as a suitable matrix, it is preferred that the inorganic oxide gel employed be a cogel of silica and an oxide of at least one metal selected from the group consisting of metals of Groups II-A, III-B, and IV-A of the Periodic Table. Such components include, for example, silica-alumina, silica-magnesia, silica-zirconia, silica-thoria, silica-beryllia, silica-titania as well as ternary combinations such as silica-alumina-thoria, silica-alumina-magnesia and silica-magnesia-zirconia. In the foregoing gels, silica is generally present as the major component and the other oxides of metals are present in minor proportion. Thus, the silica content of such gels is generally within the approximate range of about 55 to about 100 weight percent with the metal oxide content ranging from zero to 45 weight percent. The inorganic oxide hydrogels utilized herein and hydrogels obtained therefrom can be prepared by any method well-known in the art, such as for example, hydrolysis of ethyl orthosilicate, acidification of an alkali metal silicate and a salt of a metal, the oxide of which it is desired to cogel with silica. The relative proportions of finely divided crystalline alumino-silicate and inorganic oxide gel matrix can vary widely with the crystalline alumino-silicate content ranging from about 2 to about 90 percent by weight and more usually, particularly where the composite is prepared in the form of beads, in the range of about 5 to about 50 percent by weight of the composite.

The catalysts employed in the process of this invention can be used in the form of small particles of a size best suited for operation under specific conditions employed. Thus, the catalyst can be in the form of a finely divided powder or can be in the form of pellets of about $\frac{1}{16}''$ to about $\frac{1}{8}''$ in diameter obtained upon pelleting the catalysts with a suitable binder such as clay. The zeolite X, described hereinabove, can be obtained on a clay-free basis or in the form of pellets in which clay is present as a binder.

The processes of this invention may be operated over a wide range of reaction temperatures, i.e., from about 0° C. to about 600° C. In general the formation of the open chain derivatives of the episulfides, epoxides and the like is conducted at temperatures that may vary over a range as low as about 0° C. to about 300° C. At temperatures below 0° C. the reactions proceed rather sluggishly. Thus, it has been found that reaction between an episulfide and ammonia, hydrogen sulfide or water to produce a mercaptan is preferably conducted over a range of from about 30° C. to about 300° C.

Production of heterocyclic compounds may be brought about at a temperature from about 100° to about 600° C.; preferably, the temperature extends from about 150° to about 400° C. For example, particularly effective reaction temperatures for the production of piperazine from condensation of ethylene oxide and ammonia are from about 200° to about 350° C.

It will be appreciated that the choice of reaction temperatures is also determined by the catalysts that are used. Usually the catalysts that contain a high concentration of hydrogen sites are more active than those catalysts that have a sparse distribution of acid sites. Thus a higher temperature may be required to effect reactions in which a less active catalyst is employed.

The pressures utilized by this process may extend from about atmospheric to superatmospheric pressures. Often the process is conducted at atmospheric pressure. Advantageously, it has been found that extended catalytic activity and improved yields of addition products and/or their derivatives may be obtained by effecting reactions at pressures generally in excess of 200 p.s.i. and in some instances at pressures of 500 p.s.i. or above.

Various amounts of the reactants can be used for purposes of the present invention. As a rule, the amount of the hydride used will be at least about 90 percent stoichiometric, generally from about 90 percent stoichiometric to about 10 times in excess of stoichiometric. When the organic compound is highly reactive, e.g., ethylene oxide, stoichiometric proportions are often used;

whereas an excess of the hydride is employed for reactions involving the less reactive organic compounds. More than about 10 times the stoichiometric amount can be used but this is economically undesirable and usually does not materially increase the yield of products formed.

For purposes of stoichiometric calculations, one molecule of water, ammonia or hydrogen sulfide is considered to react with one episulfide group, i.e.

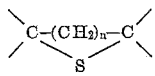

when an addition product such as an open chain mercaptan is formed. In computing stoichiometric proportions for reactions involving formation of a heterocyclic compound, the structure of the product must be considered. For example, in preparing piperazine two molecules of ethylene oxide are considered to react with two molecules of ammonia.

The amount of catalyst used to effect the reactions of this invention may vary considerably depending on whether the reaction is conducted as a batch-type operation, a continuous, or a semi-continuous process. Generally, during batch-type operation it has been found that the amount of catalyst may extend from about 5 percent by weight to about 25 percent by weight of the charged carbon-containing reactant. In continuous or semi-continuous processes where one or more reactor vessels are employed with cyclic regeneration of the catalyst, the amount of catalyst, as measured in terms of the liquid hourly space velocities of the carbon compound may be in the range from about 0.1 to about 10. It will be understood that the catalysts of this invention may be readily regenerated during the cyclic continuous processes or subsequent to their use in batch-type operation by burning the contaminants off in an air stream at temperatures of about 500° C. from about one to about three hours.

In addition, the unique activity of the alumino-silicate catalysts can be continuously maintained, while on stream, at a high level. This is accomplished by controlling the sparsity of distribution of active sites within the ordered internal structure of the alumina-silicates. It will be realized, for example, that during reaction of water with an episulfide or the like, some degradation and polymerization products are formed which coat the zeolite molecular sieve catalyst. This coating blocks off the active sites of the catalyst from contact with the reactants, thus, gradually causing the catalyst to lose its effective activity. The adverse effects of the degradation and polymerization products is conveniently minimized by the introduction of carbon dioxide and other like oxygen-containing compounds into the catalyst zone. It will be appreciated that these activators can be introduced into the charge stream or introduced as a separate stream. Activators are particularly effective when employing, as catalysts, the alkali metal salts of alumino-silicates. In general, the molar ratio between the reactants and the activators can range from about 0.001 to about 5.0.

It will be appreciated that the operating conditions employed by the present invention will be dependent upon the specific reaction being effected. Such conditions as temperature, pressure, space velocity, and the like, will have important effects on the process. Accordingly, the manner in which these conditions affect the process of this invention may be more readily understood by reference to the following specific examples.

Several of the reactions were carried out in a Vycor tubular reactor having a thermowell extending into the catalyst bed containing from 5 to 35 millimeters of catalyst. The reactor was wrapped with resistance wire and insulated with asbestos tape and aluminum foil for providing the heat to it. A variable transformer was used to regulate the heat input. An ice cooled receiver and an air cooled receiver formed a condensing system attached to the bottom of the reactor. Other reactions were conducted in a glass tubular reactor having glass wool plugs for retaining the catalyst and for facilitating collection of the product. This reactor also was heated by an electric resistance wire in a manner similar to the Vycor reactor.

After the catalyst had been raised to reaction temperature in the reactors, the reactants were passed over the catalyst for extended periods of operation.

Samples of the product stream were periodically condensed, removed, and analyzed by vapor phase chromatography infrared techniques or by fractionation.

Example I

One hundred and ten grams of a mixture of epithioethane and water, in a molar ratio of one mole of epithioethane per 10 moles of water, are passed over a catalyst bed of "4A" zeolite sieve which is at a temperature of about 95° C. and which is located in a tubular reactor.

The resultant product is collected and fractionated to obtain 2-mercaptoethanol. The percent weight conversion of 1,2-epithioethane to 2-mercaptoethanol is 36.

Example II

Five ml. of 1/10 inch pellets of acid mordenite are placed in a tubular reactor and heated to a temperature of about 100° C. One hundred grams of a mixture of epithioethane and water, in a molar ratio of one mole of 1,2-epithioethane per 10 moles of water, are passed over the acid mordenite over a period of 5½ hours. The resultant product is recovered and analyzed. The percent weight conversion of epithioethane to 2-mercaptoethanol is 80.

Example III

Sixty grams of a mixture of epithioethane and hydrogen sulfide, in a molar ratio of one mole of epithioethane per 10 moles of hydrogen sulfide, are passed over a catalyst bed of 1/16 of an inch "4A" zeolite sieve pellets which is at a temperature of about 110° C. and which is located in a tubular reactor. The product is recovered and analyzed by vapor phase chromatography. The percent weight conversion of epithioethane to 1,2-dimercaptoethane is 72.

Example IV

One hundred and forty eight grams of a mixture of 1,2-epithiopropane and water, in a molar ratio of one mole of 1,2-epithiopropane per 10 moles of water, are passed over a catalyst bed of rare earth exchanged "13X" zeolite sieve at a liquid hourly space velocity of 0.5. The resultant product is recovered and analyzed. The percent weight conversion of 1,2-epithiopropane to 1-mercapto-2-hydroxypropane and its position isomer is 32.

Example V

One hundred and forty eight grams of a mixture of 1,2-epithiopropane and water, in a molar ratio of one mole of 1,2-epithiopropane per 10 moles of water, are passed over a catalyst bed of a zeolite "Y" which is at a temperature of about 120° C. and which is located in a tubular reactor. After 5 hours, 160 grams of product are obtained, which, upon analysis, shows a percent weight conversion of 1,2-epithiopropane to 1-mercapto-2-hydroxypropane and its position isomer 71.

Example VI

Five ml. of 1/16 of an inch pellets of a rare earth exchanged "13X" zeolite sieve are placed in a tubular reactor and heated to a temperature of about 120° C. Sixty grams of a mixture of 3,4-epithiobutene-1 and water, in a molar ratio of 1 mole of 3,4-epithiobutene-1 per 5 moles of water are passed over the zeolite sieve. The product is recovered and analyzed. The percent weight conversion of 3,4-epithiobutene-1 to 3-hydroxy-4-mercaptobutene-1 and its position isomer is 28.

Example VII

Two hundred and four grams of a mixture of 1,2-epithiopentane and water, in a molar ratio of one mole of 1,2-epithiopentane per 5 moles of water, are passed over a catalyst bed of zeolite "Y" which is at a temperature of about 140° C. and which is located in a tubular reactor. After six hours, 220 grams of product are collected and the product analyzed. The percent weight conversion of 1,2-epithiopentane to 1-mercapto-2-hydroxypentane and its position isomer is 61.

Example VIII

Eight grams of a mixture of 2,3-epithiobutane and water, in a molar ratio of one mole of 2,3-epoxybutane per 5 moles of water, are passed over a catalyst bed of a "5A" zeolite sieve, which was at a temperature of about 110° C., at a liquid hourly space velocity of 0.5. The product is recovered and analyzed. The percent weight conversion of 2,3-epithiobutane to 2-mercapto-3-hydroxybutane and its position isomer is 65.

Example IX

A number of reactants are employed in a manner described in Example I, using in each instance, the same relative amount of reactants and the same catalyst. The reactants used and the products recovered are noted below:

Example XII

Following the procedure described in Example I, 20 mls. of "13X" zeolite, in the form of 1/16 inch pellets, are packed in a Vycor tubular reactor and heated to 154.4° C. Then a gaseous mixture of hydrogen sulfide at 0.2 cu. ft./hour and ethylene oxide at 0.2 cu. ft./hour are passed over the hot catalyst for three hours. Nineteen grams of liquid condensate product are collected. In addition to this product, gaseous by-products including ethylene, acetaldehyde, unreacted hydrogen sulfide and unreacted ethylene oxide are found in the product stream. On cooling of the liquid condensate, a solid separated from the solution and is obtained by filtration. The melting point of the solid is from 106° to 109° C. and its identity is established by mixed melting point and infrared spectral comparisons as 1,4-dithiane.

Example XIII

Using the same apparatus and procedure described in Example X, 30 cc. of a catalyst prepared from a "5A" zeolite, are packed in a tubular reactor and heated to a temperature of from 20.4° to 315.6° C. Then a gaseous mixture of ethylene oxide (0.28 cu. ft./hour) and hydrogen sulfide (0.38 cu. ft./hour) are passed over the catalyst for one hour. At the end of this time there is collected in the condensing system 6 grams of a liquid product consisting primarily of p-dithiane, p-dioxane, and p-thioxane.

Example XIV

Ten ml. of "13X" zeolite catalyst are placed in a Vycor

| Episulfide | Second Reactant | Product |
| --- | --- | --- |
| Epithioethane | Hydrogen sulfide | 1,2-dimercaptoethane. |
| 1,2-epithiopropane | Ammonia | mixture of 1-mercapto-2-aminopropane and its position isomer. |
| 3-phenoxy-1,2-epithiopropane | Water | mixture of 1-mercapto-2-hydroxy-3-phenoxy-propane and its position isomer. |
| 1,3-epithiopropane | ____do____ | 1-hydroxy-3-mercapto-propane. |
| Do | Hydrogen sulfide | 1,3-dimercaptobutane. |
| 5-phenyl-1,3-epithiopentane | Ammonia | mixture of 1-mercapto-3-amino-5-phenylpentane and its position isomer. |

Example X

Thirty-five ml. of a "13X" zeolite are placed in a Vycor tubular reactor and heated to a range of from 176.6° C. to 204.4° C. Then a gaseous mixture of ethylene oxide at (0.28 cu. ft./hour) and hydrogen sulfide (0.3 cu. ft./hour) is passed over the catalyst for three hours. At the end of the run, a liquid product condensate is collected and a white solid is separated from it by crystallization and filtration (yield 1.8 grams of a white solid which melted at 107° to 109° C.). Analysis of the solid product showed that it contains 39.40 percent carbon and 6.81 percent hydrogen. Theoretical percentages for 1,4-dithiane are 39.95 percent carbon, and 6.74 percent hydrogen and the reported melting point for dithiane is 111° C. In addition, the remaining 5 grams of the liquid product are analyzed by vapor phase chromatography and established as a mixture of six components including 8.4 percent by weight acetaldehyde, 26.4 percent by weight p-dioxane, 24.3 percent by weight p-thioxane, 24.5 percent by weight p-dithiane and 16.4 percent by weight of other compounds.

Example XI

Using an identical catalyst and following the same procedure as described in Example X, another run is repeated in a Vycor reactor using hydrogen sulfide at 0.35 cu. ft./hour and ethylene oxide at 0.1 cu. ft./hour for three hours. In addition to the gaseous products there is obtained 1.02 grams of a solid melting at 109° to 110° C. Infrared spectral comparison established this as being p-dithiane. Also, obtained are 4.2 grams of a liquid shown to be a mixture primarily of p-dioxane, p-thioxane and p-dithiane.

tubular reactor and heated to about 371° C. Then a mixture of ethylene oxide (0.1 cu. ft./hour) and ammonia (0.1 cu. ft./hour) is introduced into the reactor. An exothermic reaction takes place causing the temperature in the reactor to rapidly rise to about 426° C. Then the heat to the reactor is reduced to lower the temperature to about 388° C. During several hours at this temperature level, the reaction products are condensed and collected to produce a product mixture that is partly solid and partly liquid.

The solid portion is filtered and recrystallized from water to yield a product having a mixed melting point of from 105° to 109° C. Comparison of this temperature range with that of piperazine (107° C.) indicates a quantitative conversion to piperazine.

Example XV

A tubular glass reactor is packed with 32 cc. of 1/16" pellets of a rare earth exchanged zeolite X catalyst and glass wool plugs are packed at each end to contain the catalyst. Ammonia carrier gas at 366 cc. per minute is passed over the catalyst and the catalyst heated from 300° to 320° C. Then ethanolamine is dripped into the reactor at about 15 grams per hour. After about an hour, a liquid product begins dropping from the lower portion of the reactor and was collected. This product is separated into two layers, a top colorless layer and a bottom yellow layer. Chromographic analysis indicates a variety of condensed amine products, and the presence of 20 percent of triethylenediamine.

Example XVI

Ten grams of a hydrogen-exchanged mordenite catalyst is placed in a tubular reactor and heated to 250° C. Then 300 ml./minute of anhydrous ammonia and diethanolamine at a rate of 20 ml. per hour are passed through the catalyst bed. In 2 hours, 30 grams of a liquid product are condensed and after cooling distilled to give a yield of 48 percent of piperazine.

Inspection of the above examples shows that the present invention provides an efficient process for production of quantitative yields of addition products such as mercaptans and a variety of heterocyclic compounds over a wide range of operating conditions. In addition, improved product recovery and extended catalyst activity are obtained by the thermal stability of the catalyst which allows complete regeneration during continuous processes.

It will also be appreciated that the examples set forth above as well as the foregoing specification are merely illustrative of the different reactants that are used in accordance with the present process and that other such reactants may be employed in the presence of the alumino-silicate catalysts contemplated by this invention.

It will further be appreciated that the alumino-silicates having active cation sites other than those used in the examples may be employed as catalysts for this process and that various modifications and alterations may be made in the process without department from the spirit of the invention.

What is claimed is:

1. A process for producing heterocyclic compounds containing hetero nitrogen atoms which comprises effecting reaction of ammonia with an organic compound selected from the group consisting of ethylene glycol, dichloroethane, ethylene oxide, ethanolamine and diethanolamine at a temperature of from about 100° to about 600° C. in the presence of a catalyst comprising an alumino-silicate containing active cation sites within an ordered internal structure; said ordered internal structure having a pore size of at least 5A. in diameter.

2. The process of claim 1 in which the alumino-silicate has a silicon to aluminum ratio of at least about 1.8.

3. The process of claim 1 in which the sites are produced by cations selected from the group consisting of exchangeable metals, ammonium, hydrogen, and mixtures thereof.

4. The process of claim 1 in which said sites are produced by cations of the rare earth metals.

5. The process of claim 1 in which said sites are produced by cations selected from the group consisting of the alkali metals and the alkaline earth metals.

6. The process of claim 1 in which the alumino-silicate catalyst is a "13X" zeolite.

7. The process of claim 1 in which the alumino-silicate catalyst is a "Y" zeolite.

8. The process of claim 1 in which the alumino-silicate catalyst is an "A" zeolite.

9. The process of claim 1 in which the alumino-silicate is supported by an inert matrix binder.

10. The process of claim 1 in which ammonia is used in an amount of at least about 90 percent of stoichiometric.

11. The process of claim 1 in which the ammonia is used in an amount of from about 90 percent of stoichiometric to about ten times in excess of stoichiometric.

12. The process of claim 1 in which the alumino-silicate is selected from the group consisting of a faujasite and homologs thereof.

13. The process of claim 1 in which the alumino-silicate catalyst is a rare earth exchanged faujasite.

14. The process of claim 1 in which the alumino-silicate catalyst is hydrogen exchanged zeolite Y.

15. The process of claim 1 in which the alumino-silicate catalyst is hydrogen exchanged mordenite.

16. The process of claim 1 in which said reaction is conducted from about atmospheric to superatmospheric pressures.

17. A process for producing piperazine which comprises effecting reaction of ammonia and ethylene oxide at a temperature of from about 100° to about 400° C. in the presence of a sodium form of faujasite and recovering a product of piperazine.

18. A process for producing triethylenediamine which comprises effecting reaction of ammonia and ethanolamine at a temperature from about 100° to about 400° C. in the presence of a rare earth exchanged faujasite and recovering a product of triethylenediamine.

References Cited

UNITED STATES PATENTS

| 3,120,524 | 2/1964 | Godfrey | 260—268 |
| 3,138,598 | 6/1964 | Speranza | 260—268 |
| 3,082,214 | 3/1963 | Bluestone | 260—327 |
| 3,096,342 | 7/1963 | Krespan | 260—327 |
| 3,076,851 | 2/1963 | Newworth | 260—609 |
| 3,193,583 | 7/1965 | Ladd | 260—609 |

FOREIGN PATENTS 871,754   6/1961   Great Britain.

HENRY R. JILES, *Primary Examiner.*

J. A. ADAMS, *Assistant Examiner.*